March 1, 1960     J. OPPENHEIMER     2,926,559
PROMPTING APPARATUS FOR CAMERAS
Filed April 6, 1953

JESS OPPENHEIMER, INVENTOR.

BY Bernard Kriegel
ATTORNEY.

United States Patent Office 2,926,559
Patented Mar. 1, 1960

2,926,559
PROMPTING APPARATUS FOR CAMERAS

Jess Oppenheimer, West Los Angeles, Calif., assignor to Jayo Corporation, Los Angeles, Calif., a corporation of California Application April 6, 1953, Serial No. 346,987

9 Claims. (Cl. 88—16)

The present invention relates to prompting apparatus for advising persons, such as actors, news reporters, news commentators, and other performers, of their lines or cues, and more particularly to apparatus of the character indicated to be used in combination with motion picture and television cameras.

As a practical matter, certain performers appearing before television or motion picture cameras, such as news reporters and masters of ceremonies, cannot be expected to memorize their lines or the script. Instead, prompting devices may be used from which the performer reads his lines. Such devices have been disposed out of the field of action of the camera lens, which requires the eyes of the performer to be shifted alternately away from and back to the camera. Such shifting of the eyes is obvious to the viewers of the program, which is disconcerting to them, minimizing the effectiveness of the program to a considerable extent.

An object of the present invention is to overcome the aforenoted difficulties by providing prompting apparatus which supplies the performer visually with the required words, instructions, or other intelligence, while the performer is looking directly into the camera lens.

Another object of the invention is to provide prompting apparatus of the character indicated, capable of use in combination with television and motion picture cameras without necessitating any change in the mode of operation of the particular camera being used and without deleterious effects on the scene pictured by the camera.

A further object of the invention is to provide prompting apparatus for supplying easily readable visual indications to a performer while the latter is looking directly into the camera lens.

Yet another object of the invention is to provide a prompting apparatus of the type indicated above which is capable of use with cameras of existing types, and without requiring their modification.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings.

In its general aspects, the invention contemplates an apparatus which will enable a person to look directly into the lens or aperture of a camera, and, while looking in such direction, be supplied with words or other intelligence to be spoken or followed by him. The particular matter viewed by the person is not seen by the camera. A transparent member is placed between the camera and the person, disposed at an oblique angle to the direction in which the person is looking, or the axis of the lens or aperture. Since this member is transparent, the picture of the person or subject, as viewed by the camera, is unobstructed. However, since the transparent member is disposed at a reflecting angle to the person, the words that are to be transmitted to him may be projected on such member at an angle that reflects the words toward the person's eyes. In other words, the words will appear as a virtual image behind the surface of the transparent member in much the same manner as if they were being viewed in an ordinary mirror. The person can, therefore, read the words directly by looking at the inclined transparent member. However, the words are not transmitted into the lens or aperture of the camera, but the image of the person is transmitted to and through the lens or aperture.

Figure 1:
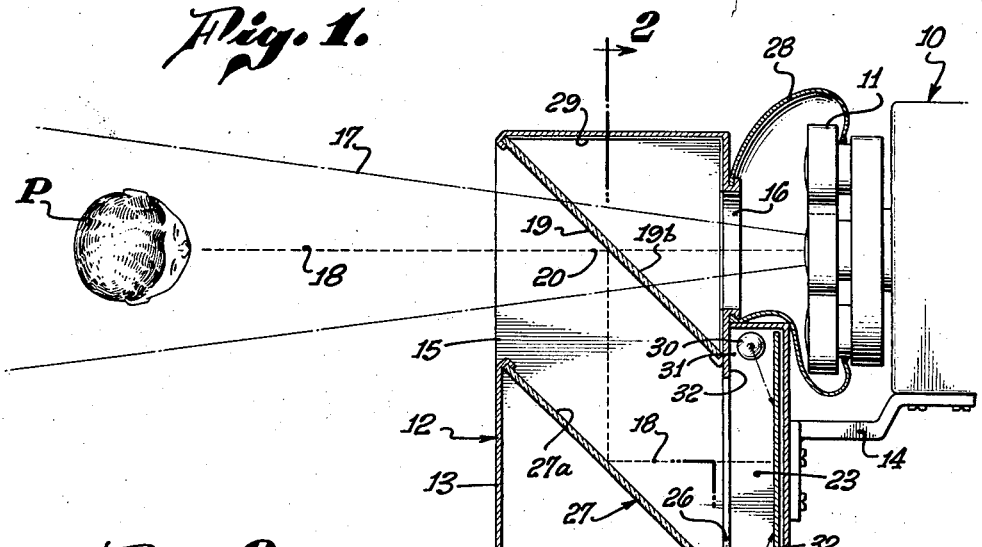
Figure 1 is a top plan view of a prompting apparatus, shown in conjunction with a camera and a person, parts being disclosed in horizontal section.
Figure 2:
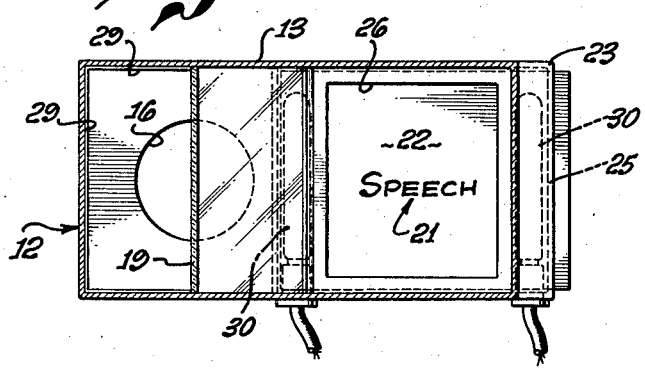
Fig. 2 is a vertical section taken generally along the line 2—2 on Fig. 1.

As disclosed in Figs. 1 and 2, a motion picture or television camera 10 is disposed in front of a person P who is to look directly into the camera lens or aperture (not shown). The camera may have the usual lens turret 11 for holding a plurality of lenses, which may be shifted selectively before the usual aperture of the camera. Interposed between the camera 10 and the person P is the prompting device 12, which may be supported by the camera structure itself, although it may be supported separately.

As shown in the drawings, the prompting device 12 includes a box, cabinet, or other enclosure 13, suitably attached to a supporting bracket 14 affixed to the camera frame. The cabinet 13 has a front opening 15 and an aligned rear opening 16 that are disposed in advance of the camera lens, the lens having any desired viewing angle, as represented by the broken lines 17 in Fig. 1. The axis of the lens or aperture is indicated by the broken line 18, and is aimed substantially directly at the person P whose features are to be transmitted to the camera 10.

A plane mirror 19 is disposed in the compartment 13 in a vertical position and at a substantial angle to the axis 18 of the lens and a vertical central plane 20 passing through both the front and rear openings 15, 16. This mirror 19 is transparent, so that it will pass light rays, emanating from the person P, with negligible distortion of loss of light to the camera lens.

The transparent member 19 is designed to reflect an object to the eyes of the person. The object may have words or lines that are to be read by the person P while looking directly through the transparent member 19 into the camera lens. The words or lines 21 may be written or printed upon a piece of paper or a card 22 mounted within a compartment 23 forming a rear portion of the cabinet 13 and disposed laterally of the transparent member 19. The printed or written matter 21 is located on the forward surface of the card 22, which is insertable through a suitable vertical slot 24 in an end wall 25 of the compartment 23. The card itself is disposed in a vertical plane substantially at right angles to the axis 18 of the lens, an image of the printed matter 21 being thrown through a compartment opening 26 upon a mirror 27 mounted in the cabinet 13 and arranged at a substantial angle to the card 22. This mirror 27 will reflect the image of the card to the transparent member 19, which will, in turn, reflect the image to the eyes of the person P.

As shown specifically in the drawing, the transparent mirror 19 is disposed at an angle of forty-five degrees to the axis 18 of the lens, and the reflecting mirror 27 disposed within the cabinet transversely of the opening 26 is also disposed at a forty-five degree angle to the axis 18 of the lens, the two plane members 19, 27 being parallel to one another. The card 22 containing the printed or written matter is disposed at right angles to the axis of the lens, which places the rear mirror 27 at a forty-five degree angle to the card. Thus, the image of the card 22 will appear on the rear mirror 27 in a reverse position, and will then be projected by this mirror in a direction at right angles to the axis 18 of the lens toward the forward transparent mirror 19. Since the reflecting surface of the mirror faces the other mirror 27, the card will appear as a virtual image in a forward position to the person P looking directly into the lens of the camera 10.

The box or cabinet 13 is preferably light tight, except where the front and rear openings 15, 16 appear, for the purpose of preventing extraneous light from interfering with the image transmitted to the viewer and to prevent undesired light from passing into the lens of the camera. To accomplish this objective, a flexible sleeve 28, which may be made of black cloth of sufficient thickness so as not to transmit any light, is placed around the rear opening 16 of the cabinet 13, and also around the camera 10. Accordingly, the camera lens cannot have the image of the person P interfered with by extraneous light. In addition, the inner walls 29 of the cabinet are preferably painted black with non-reflecting paint, or lined with a black non-reflecting material, so that none of the image of the card 22 will be reflected from any portion of the interior of the compartment or cabinet 13 into the lens of the camera 10.

The rear mirror 27 itself is disposed transversely to one side of the cabinet 13 to a sufficient extent, placing it out of the angle 17, 17 of the camera lens. Accordingly, the lens is incapable of receiving any reflection from the rear mirror 27.

In order that the image of the card 22 may be reflected clearly to the person, its front surface is suitably illuminated. Illumination may be provided by suitable light sources 30 placed at the sides of the rear compartment 23, the light from these sources striking the card so that the illuminated image of the latter is transmitted to the rear mirror 27 and is reflected by the rear mirror to the transparent front mirror 19. With proper intensity of illumination, the matter 21 written or printed upon the card can be viewed easily by the person P. The light sources 30 themselves, however, are disposed in side recesses 31 in the rear compartment 23, baffles 32 at the sides of the rear opening 26 preventing the illumination from passing directly from the source 30 to the rear mirror 27. Instead, the only illumination that is transmitted to the rear mirror is that which is reflected from the front surface of the card 22.

The rear mirror 27 preferably has its first surface provided with a suitable reflector coating 27a, such as an aluminum or silver coating. In this manner, distortion or duplication of the image transmitted to the front transparent mirror 19 is prevented. If the rear of the mirror 27 embodied the reflective coating, and, if the mirror had any appreciable thickness, then both the rear and front surfaces of the mirror would be projecting images toward the forward mirror 19, displaced with respect to each other. Thus, the forward mirror would transmit a double image to the person P that might prove confusing or, at least, disconcerting. For that matter, if the front transparent mirror 19 had any appreciable thickness, as if it were made of plate glass, a double image would still be transmitted to the person, since both the front and rear surfaces of this mirror would be disposed at reflecting angles to the light rays projected from the rear mirror 27. In addition, any appreciable thickness of the front transparent mirror 19 would tend to refract the rays transmitted from the person to the camera lens and would produce some interference and distortion.

To minimize both of these latter defects, if not eliminate them entirely, the forward transparent member 19 can be made relatively thin. It can be constituted as a pellicle formed of a material which will transmit, without substantial interference, all of the light reflected from the person P to the camera lens, but which will still be disposed at an angle to the light rays reflected from the rear mirror 27, so as to reflect these light rays to the person. This pellicle may have a thickness of the order of 0.0001 of an inch. With such a very thin member, the reflection of double images to the person P is eliminated, as well as the refraction of the light rays reflected from the person and passing to the lens of the camera 10.

Transmission of a double image can also be minimized or eliminated substantially entirely by coating the rear surface 19b of the forward mirror 19 with a very thin layer of material which will not reflect the image.

Figure 3:
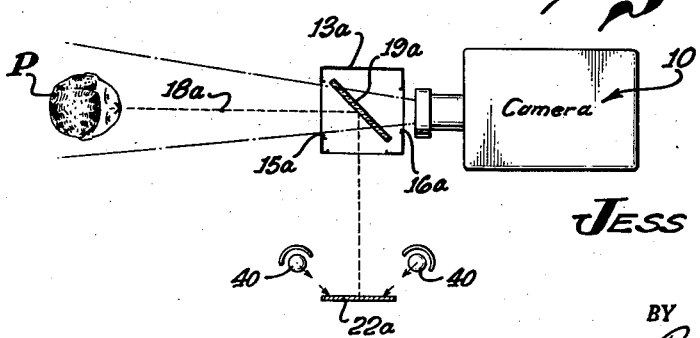
Fig. 3 is a top plan, diagrammatic view, similar to Fig. 1, including a modified form of prompting apparatus.

In the form of invention disclosed in Fig. 3, only a forward transparent mirror 19a is disposed within a cabinet 13a mounted in front of the camera lens. This cabinet has the front and rear openings 15a, 16a, and the mirror 19a is disposed at an angle to the axis 18a of the lens. The card 22a, or other object bearing the written or printed information to be conveyed to the person P, is disposed in a vertical plane parallel to the axis of the camera lens, and will have light from a suitable source 40 shining upon it which is preferably shielded from the camera. The light striking the printed or written surface of the card 22a will be reflected to the transparent mirror 19a in a direction substantially at right angles to the axis 18a of the lens. Since the mirror 19a is disposed at a forty-five degree angle to the axis of the lens, the incident rays from the card will be reflected directly to the eyes of the person positioned before the camera 10.

With the arrangement disclosed in Fig. 3, the image will be reversed. For that reason, it will be necessary for the matter appearing on the card 22a to be reversed thereon, so that it will appear in a forward direction to the person reading the matter. With the apparatus disclosed in Figs. 1 and 2, it is unnecessary for the material appearing on the card 22 to be reversed, since the rear mirror 27 will effect a reversal and will then transmit the reversed image to the front mirror 19, where it will appear in a proper forward direction.

By virtue of the invention, the person P will see the printed matter 21, or other image, directly in the forward transparent mirror 19 or 19a. While looking directly into the camera lens, he can read the required material without shifting his eyes to some other source where the printed material is placed, as has heretofore been necessary. He will, therefore, give no indication to the camera that he is reading any material from another source, or that the material has not been memorized by him. The net effect will be the same as if the person were talking directly to the viewer at the television receiving set, or watching a motion picture screen, in the event a motion picture is projected thereon.

Although a single card 22 is disclosed in the drawings, it is quite evident that a plurality of cards can be stacked one behind the other in the rear compartment and removed as need be. In addition, it is evident that the printed or written matter can be disposed on other objects. For example, it might be contained in a roll form that can be shifted along the vertical compartment 23, the shifting sheet being easily viewed by the person in the same manner as the card specifically shown.

The prompting apparatus is usable without any modification of existing cameras, nor does it interfere with the mode of operation of the camera. The camera operator directs the camera with the desired lens placed across its aperture in the usual manner, the person being televised, or whose picture is being taken, merely looking directly into the lens of the camera in the same manner as if the prompting device 12 were not present.

The inventor claims:

1. A prompting appliance for attachment to the front of a motion picture camera, television camera, and like lens-equipped picture recording device; comprising a housing with an open front defined by opposite side walls, a top wall and a rear wall with an opening for alignment with the axis of said lens; plate-shaped image transmitting means extending at an angle to said lens axis between said opposite side walls within said housing; said transmitting means further extending from said rear wall at a location below said opening to a portion of said top wall, whereby within said housing a polygonal-shaped closed space is defined by said image transmitting means and by respective adjacent portions of said rear wall, of said top wall and of said side walls; spaced apart reflector means located adjacent the side walls of said housing and adapted to accommodate lamp means; means for carrying a script and supported by said housing; said reflector means being shaped and arranged in said housing to direct light rays from said lamp means when placed in said reflector means onto the median portion of said scrip carrying means for reflection therefrom onto said image transmitting means, whereby any stray light rays from said lamp means are prevented from reaching said image transmitting means; means connected to said housing for attaching the latter to said recording device, whereby said opening of said rear wall is aligned with the axis of said lens and located forwardly of the latter; said housing when attached to said recording device being movable in unison therewith and relative to a person when placed in front of the lens, so that said script on said carrying means is illuminated centrally thereof by said lamp means and reflected on said image transmitting means with concentrated intensity for prompting purposes while said lens remains capable of recording a picture of said person through said image transmitting means and said closed space, and darkening means encircling said lens and being of greater dimension than that of said opening in said rear wall to protect said lens and said space from outside incident light.

2. A prompting appliance for attachment to the front of a motion picture camera, television camera, and like lens-equipped picture recording device; comprising a first housing having walls and an open front, one of said walls being a rear wall provided with an opening for alignment with the axis of said lens; plate-shaped image transmitting means extending at an angle to said lens axis within said first housing, whereby within said first housing a polygonal-shaped space is defined by said image transmitting means and by respective adjacent wall portions located rearwardly of said image transmitting means; a second housing for accommodating a script therein, said second housing being supported by said first housing; means connected to said first housing for attaching the latter to said recording device, whereby said opening of said rear wall of said first housing is aligned with the axis of said lens and located forwardly of the latter; said first housing when attached to said recording device being movable in unison therewith and relative to a person when placed in front of the lens, said script when received in said second housing being exposed to and located relative to said image transmitting means to thereby permit reflection of said script on said image transmitting means centrally of the latter and about said lens axis for prompting purposes while said lens remains capable of recording a picture of said person through said image transmitting means and said space located rearwardly of said image transmitting means; darkening means encircling said lens, the outer confines of said darkening means being of greater dimension than the diameter of said opening in said rear wall to thereby protect said lens and said space from outside incident light; and shade frame means carried by said first housing and located forwardly of said image transmitting means and defining said open front of said first housing.

3. A prompting appliance for attachment to the front of a motion picture camera, television camera, and like lens-equipped picture recording device; comprising a first housing having walls and an open front, one of said walls being a rear wall provided with an opening for alignment with the axis of said lens; plate-shaped image transmitting means extending at an angle to said lens axis within said first housing, whereby within said first housing a polygonal-shaped space is defined by said image transmitting means and by respective adjacent wall portions located rearwardly of said image transmitting means; a second housing for accommodating a script therein, one of said housings being supported from said other housing; means connected to one of said housings for attaching the latter to said recording device, whereby said opening of said rear wall of said first housing is aligned with the axis of said lens and located forwardly of the latter; said housings and recording device being movable in unison and relative to a person when placed in front of the lens when said one housing is attached to said recording device, said script when received in said second housing being exposed to and located relative to said image transmitting means to thereby permit reflection of said script on said image transmitting means centrally of the latter and about said lens axis for prompting purposes while said lens remains capable of recording a picture of said person through said image transmitting means and said space located rearwardly of said image transmitting means; darkening means encircling said lens, the outer confines of said darkening means being of greater dimension than the diameter of said opening in said rear wall to thereby protect said lens and said space from outside incident light; and shade frame means carried by said first housing and located forwardly of said image transmitting means and defining said open front of said first housing.

4. A prompting appliance for attachment to the front of a motion picture camera, television camera, and like lens-equipped picture recording device; comprising a housing having a front opening and a rear opening for alignment with the axis of said lens; plate-shaped image transmitting means disposed within said housing between said openings and extending at an angle to said lens axis; said housing having means therewithin for accommodating a script; means connected to said housing for attaching the latter to said recording device, whereby said rear opening of said housing is aligned with the axis of said lens and located forwardly of the latter; said housing when attached to said recording device being movable in unison therewith and relative to a person when placed in front of the lens, said script when received in said housing being exposed to and located relative to said image transmitting means to thereby permit reflection of said script on said image transmitting means centrally of the latter and about said lens axis for prompting purposes while said lens remains capable of recording a picture of said person through said rear opening and said image transmitting means; darkening means encircling said lens and being disposed adjacent said housing and said rear opening, said darkening means being of such dimensions as to thereby protect said lens and the interior of said housing rearwardly of said image transmitting means from outside incident light; and shade means carried by said housing forwardly of said image transmitting means to thereby protect said image transmitting means from outside incident light forwardly of said image transmitting means.

5. A prompting appliance for attachment to the front of a motion picture camera, television camera, and like lens-equipped picture recording device; comprising a housing having a front opening and a rear opening for alignment with the axis of said lens; plate-shaped image transmitting means disposed within said housing between said openings and extending at an angle to said lens axis; said housing having means therewithin for accommodating a script; means connected to said housing for attaching the latter to said recording device, whereby said rear opening of said housing is aligned with the axis of said lens and located forwardly of the latter; said housing when attached to said recording device being movable in unison therewith and relative to a person when placed in front of the lens, said script when received in said housing being exposed to and located relative to said image transmitting means to thereby permit reflection of said script on said image transmitting means centrally of the latter and about said lens axis for prompting purposes while said lens remains capable of recording a picture of said person through said rear opening and said image transmitting means; darkening means encircling said lens, the outer confines of said darkening means being of greater dimension than the diameter of said rear opening to thereby protect said lens and the interior of said housing rearwardly of said image transmitting means from outside incident light; and shade means carried by said housing forwardly of said image transmitting means to thereby protect said image transmitting means from outside incident light forwardly of said image transmitting means.

6. A prompting appliance for attachment to the front of a motion picture camera, television camera, and like lens-equipped picture recording device; comprising a housing having walls and a front opening, one of said walls being a rear wall provided with an opening for alignment with the axis of said lens; plate-shaped image transmitting means extending at an angle to and in alignment with said lens axis and disposed within said housing between said openings forwardly of said lens, whereby within said housing a polygonal-shaped space is defined by said image transmitting means and by respective adjacent wall portions located rearwardly of said image transmitting means; spaced apart reflector means carried by said housing and adapted to accommodate lamp means; means for carrying a script and supported by said housing; said reflector means being shaped and arranged in said housing to direct light rays from said lamp means when placed in said reflector means onto the median portion of said script carrying means for reflection therefrom onto the forward face of said image transmitting means, whereby any stray light rays from said lamp means are prevented from reaching said image transmitting means; means connected to said housing for attaching the latter to said recording device, whereby said opening of said rear wall is aligned with the axis of said lens and located forwardly of the latter; said housing when attached to said recording device being movable in unison therewith and relative to a person when placed in front of the lens, so that said script on said carrying means is illuminated centrally thereof by said lamp means and reflected on the forward face of said image transmitting means with concentrated intensity for prompting purposes while said lens remains capable of recording a picture of said person through said image transmitting means and said closed space, and darkening means encircling said lens and being of greater dimension than that of said opening in said rear wall to protect said lens and said space from outside incident light.

7. A prompting appliance for attachment to the front of a motion picture camera, television camera, and like lens-equipped picture recording device; comprising a housing having a front opening and a rear opening for alignment with the axis of said lens; plate-shaped image transmitting means extending at an angle to and in alignment with said lens axis and disposed within said housing between said openings forwardly of said lens; reflector means carried by said housing and adapted to accommodate lamp means; means for carrying a script and supported by said housing; said reflector means being shaped and arranged in said housing to direct light rays from said lamp means when placed in said reflector means onto the median portion of said script carrying means for reflection therefrom onto the forward face of said image transmitting means, whereby any stray light rays from said lamp means are prevented from reaching said image transmitting means; means connected to said housing for attaching the latter to said recording device, whereby said rear opening is aligned with the axis of said lens and located forwardly of the latter; said housing when attached to said recording device being movable in unison therewith and relative to a person when placed in front of the lens, so that said script on said carrying means is illuminated centrally thereof by said lamp means and reflected on the forward face of said image transmitting means with concentrated intensity for prompting purposes while said lens remains capable of recording a picture of said person through said rear opening and said image transmitting means; and darkening means encircling said lens and disposed adjacent said rear opening, said darkening means being of such dimensions as to protect said lens and the interior of said housing rearwardly of said image transmitting means from outside incident light.

8. A prompting appliance as defined in claim 4; wherein said plate-shaped image transmitting means comprises a transparent mirror forwardly of said lens and at an angle to and in alignment with the lens axis, and also comprises another mirror disposed out of the viewing angle of said lens for reflecting images from said script onto the forward face of said transparent mirror.

9. A prompting appliance as defined in claim 7; wherein said plate-shaped image transmitting means comprises a transparent mirror forwardly of said lens and at an angle to and in alignment with the lens axis, and also comprises another mirror disposed out of the viewing angle of said lens for reflecting images from said script onto the forward face of said transparent mirror.

References Cited in the file of this patent
UNITED STATES PATENTS

| | | |
|---|---|---|
| 1,636,834 | Peters et al. | July 26, 1927 |
| 1,818,354 | Pomeroy | Aug. 11, 1931 |
| 1,959,038 | Ridgway | May 15, 1934 |
| 2,076,103 | Thorner | Apr. 6, 1937 |
| 2,311,914 | Tiffin et al. | Feb. 23, 1943 |
| 2,420,198 | Rosenthal | May 6, 1947 |
| 2,484,379 | Goldberg | Oct. 11, 1949 |
| 2,598,947 | Thielen | June 3, 1952 |
| 2,711,667 | Simjian | June 28, 1955 |